(12) United States Patent
Rigby (10) Patent No.: US 7,676,951 B2
(45) Date of Patent: Mar. 16, 2010

(54) METHOD AND APPARATUS FOR LINEAR MEASUREMENT OF A STATOR CORE

(75) Inventor: Marc H. Rigby, Glenville, NY (US)

(73) Assignee: General Electric Company, Schenectady, NY (US)

( * ) Notice: Subject to any disclaimer, the term of this patent is extended or adjusted under 35 U.S.C. 154(b) by 417 days.

(21) Appl. No.: 11/837,948

(22) Filed: Aug. 13, 2007

(65) Prior Publication Data
US 2009/0000138 A1 Jan. 1, 2009

Related U.S. Application Data

(60) Provisional application No. 60/946,380, filed on Jun. 26, 2007.

(51) Int. Cl.
*G01B 3/12* (2006.01)
*G01B 21/02* (2006.01)
(52) U.S. Cl. ....................................................... 33/776
(58) Field of Classification Search ........... 33/772–776, 33/832–833, 1 BB, 542, 549, 1 PT, 1 N
See application file for complete search history.

(56) References Cited

U.S. PATENT DOCUMENTS

| 3,758,954 | A | * | 9/1973 | Teplitz | 33/776 |
| 4,330,941 | A | * | 5/1982 | Haley | 33/776 |
| 5,777,730 | A | * | 7/1998 | Dunlap | 356/237.1 |
| 6,847,224 | B2 | | 1/2005 | Lee et al. | |
| 6,932,732 | B2 | * | 8/2005 | Linck et al. | 474/153 |
| 7,045,088 | B2 | | 5/2006 | Matsumiya et al. | |
| 7,208,971 | B2 | | 4/2007 | Lee et al. | |
| 2008/0308324 | A1 | * | 12/2008 | Moser et al. | 180/6.7 |

* cited by examiner

*Primary Examiner*—Yaritza Guadalupe-McCall
(74) *Attorney, Agent, or Firm*—Cantor Colburn LLP (57) ABSTRACT

A linear measurement device for a stator core inspection system includes a plurality of wheels rotatably mounted to a frame. Each of the wheels has a contact surface and a hub portion. The linear measurement device further includes an encoder gear rotatably mounted to the frame. The linear measurement device further includes a sensor configured to generate a signal indicative of rotation of the encoder gear. The linear measurement device further includes a belt configured to engage the hub portion of each wheel and the encoder gear, and rotation of one wheel causing synchronous rotation of the encoder gear and the other wheels.

19 Claims, 11 Drawing Sheets

METHOD AND APPARATUS FOR LINEAR MEASUREMENT OF A STATOR CORE

CROSS REFERENCE TO RELATED APPLICATION

This application claims the benefit of U.S. patent application Ser. No. 60/946,380, filed on Jun. 26, 2007, the contents of which are incorporated herein by reference thereto.

BACKGROUND OF THE INVENTION

The present application relates to a linear measurement device that accurately measures linear distances along a low-friction surface of a stator core.

Electrical generators and large electric motors include stator core windings that produce a significant amount of heat. This heat can degrade the insulation of the stator core windings. Equipment configured to detect insulation degradation is typically moved along the surface of the stator core in order to detect variances in the leakage flux, which are indicative of the state of the insulation of the stator. The surface of the stator core is typically painted and can be contaminated with oil, dust and other foreign matter that decreases friction on the stator core. The decreased friction undesirably interferes with the equipment's ability to accurately determine linear distances as the equipment is moved along on the surface of the stator core, to determine locations where the insulation is degraded.

The inventors herein have recognized that it is desirable to provide a linear measurement device that accurately measures linear distances along low-friction surfaces of a stator core.

BRIEF DESCRIPTION OF THE INVENTION

A linear measurement device in accordance with an exemplary embodiment is provided. The linear measurement device includes a plurality of wheels rotatably mounted to a frame. Each of the wheels has a contact surface and a hub portion. The linear measurement device further includes an encoder gear rotatably mounted to the frame. The linear measurement device further includes a sensor configured to generate a signal indicative of rotation of the encoder gear. The linear measurement device further includes a belt configured to engage the hub portion of each wheel and the encoder gear, and rotation of one wheel causing synchronous rotation of the encoder gear and the other wheels.

A system for inspecting a stator core in accordance with another exemplary embodiment is provided. The system includes a trolley configured to move along the stator core. The system further includes a linear measurement device mounted to the trolley. The linear measurement device has a plurality of wheels rotatably mounted to a frame. Each of the wheels has a contact surface and a hub portion. The linear measurement device further includes an encoder gear rotatably mounted to the frame. The linear measurement device further includes a sensor configured to generate a signal indicative of rotation of the encoder gear. The linear measurement device further includes a belt configured to engage the hub portion of each wheel and the encoder gear, and rotation of one wheel causing synchronous rotation of the encoder gear and the other wheels. The system further includes a controller configured to receive the signal and to determine a linear distance value indicating a linear distance that the linear measurement device has traveled on the stator core.

A method of detecting a linear distance of a linear measurement device on a stator core, in accordance with another exemplary embodiment is provided. The method includes rolling at least one of a plurality of wheels of the linear measurement device along a surface of the stator core. The method further includes synchronously rotating an encoder gear of the linear measurement device with at least one of the wheels. The wheels and the encoder gear are rotatably coupled to each other by a belt. The belt is configured to engage the encoder gear and a hub portion of each wheel. The method further includes generating a signal from a sensor operably coupled to the encoder gear, with the signal being indicative of rotation of the encoder gear. The method further includes determining a linear distance value indicating a linear distance that the linear measurement device has traveled on the stator core based on the signal, utilizing a controller.

The above-described and other features of the present disclosure will be appreciated and understood by those skilled in the art from the following detailed description, drawings, and appended claims.

DETAILED DESCRIPTION OF THE INVENTION

The present application is directed to a linear measurement device that accurately measures linear distances along a low-friction surface. In these embodiments, the device may be a component of a system for detecting faults in the stator core of an electrical generator and tracking the locations of those faults. It is further contemplated that the device can be used in a variety of other suitable systems and applications as desired.

Figure 1:
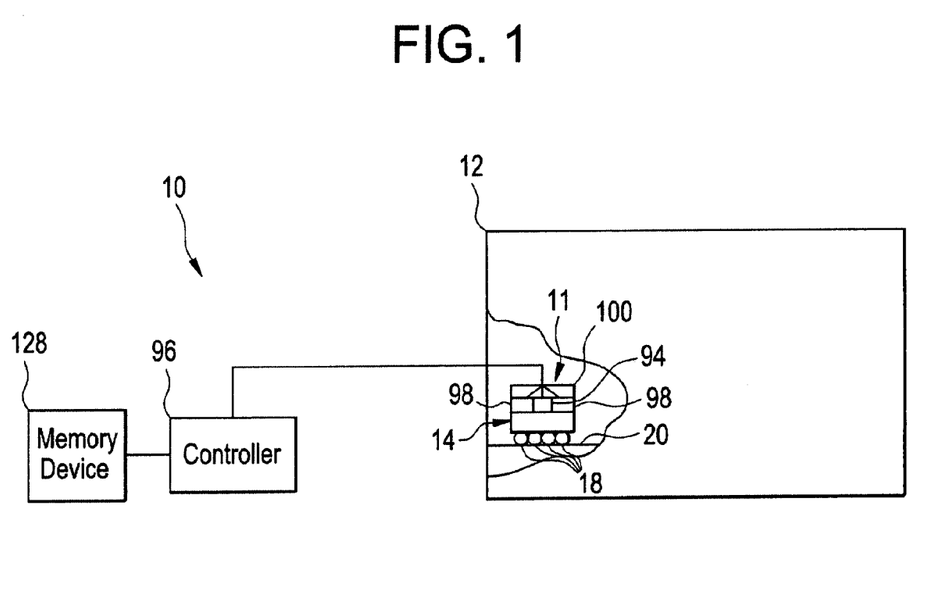
FIG. 1 is a schematic view of a system having a linear measurement device for inspecting a stator core, in accordance with an exemplary embodiment.
Figure 2:
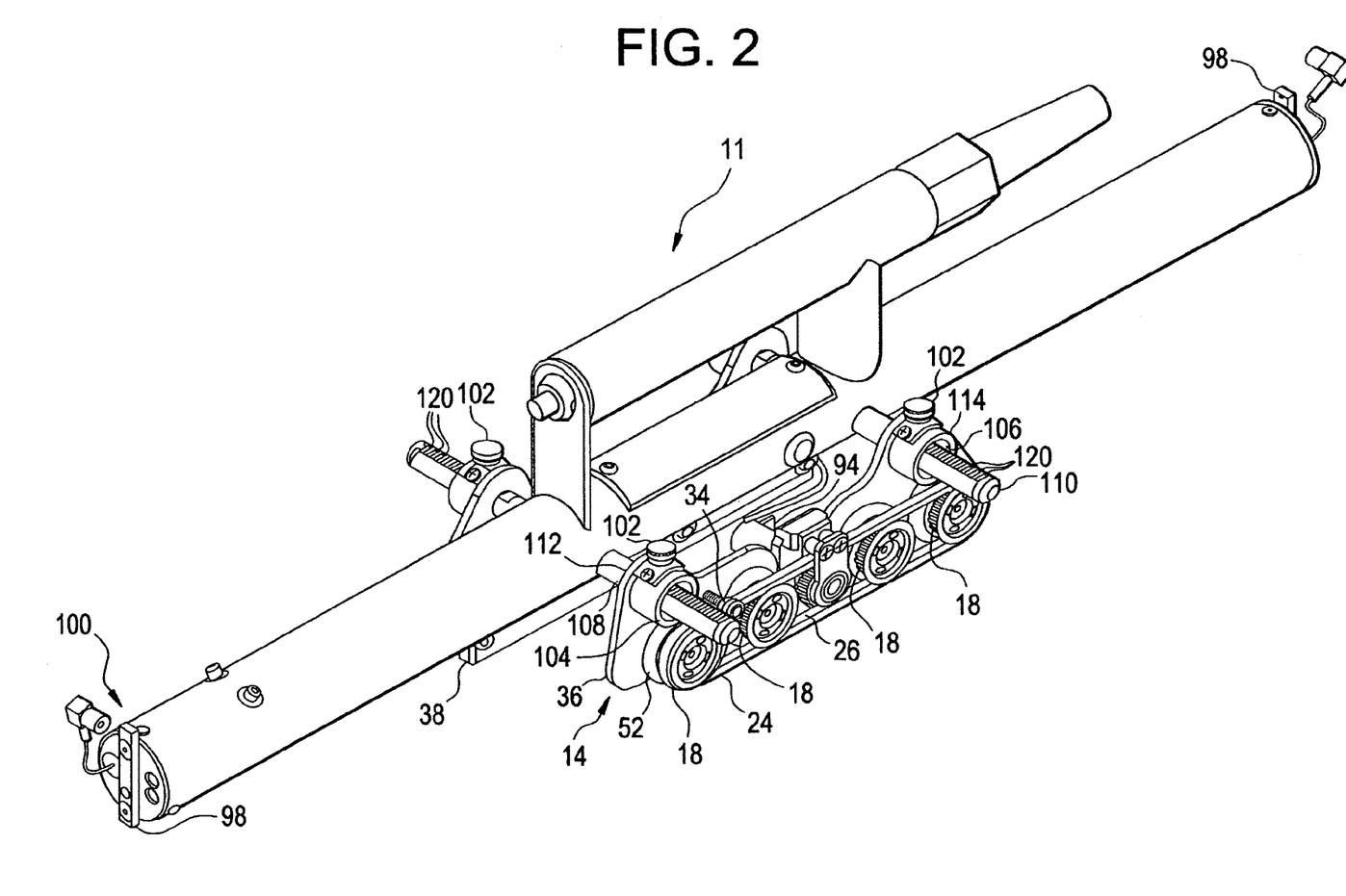
FIG. 2 is a perspective view of the linear measurement device of FIG. 1.
Figure 6:
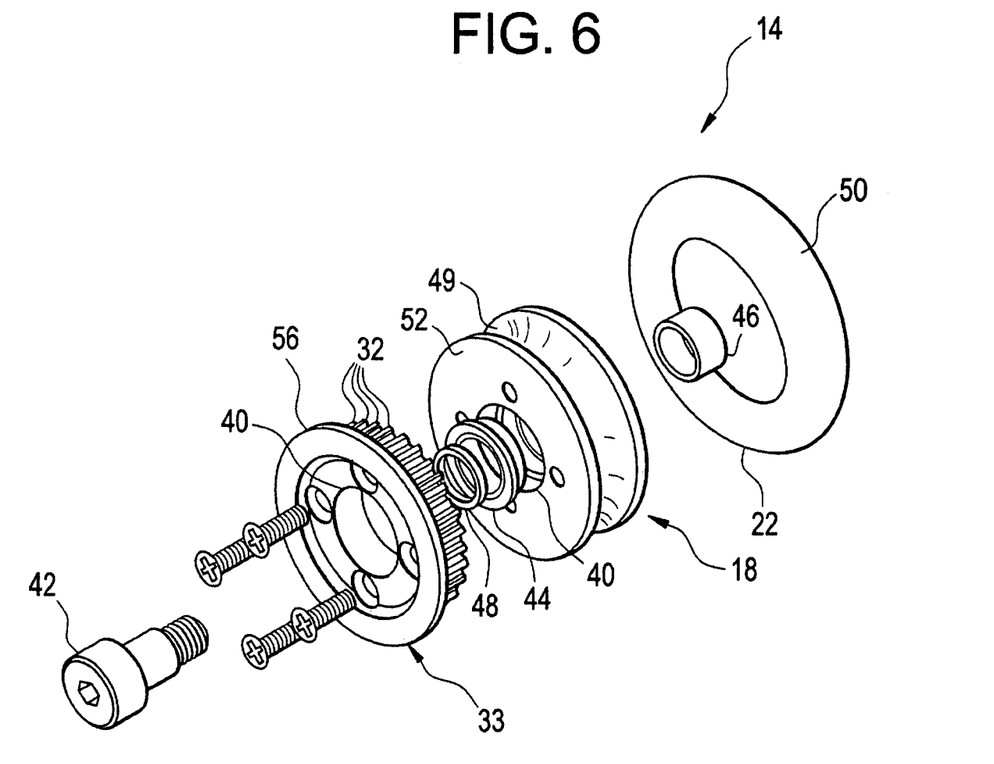
FIG. 6 is an exploded view of one of the wheels of the linear measurement device of FIG. 3.
Figure 7:
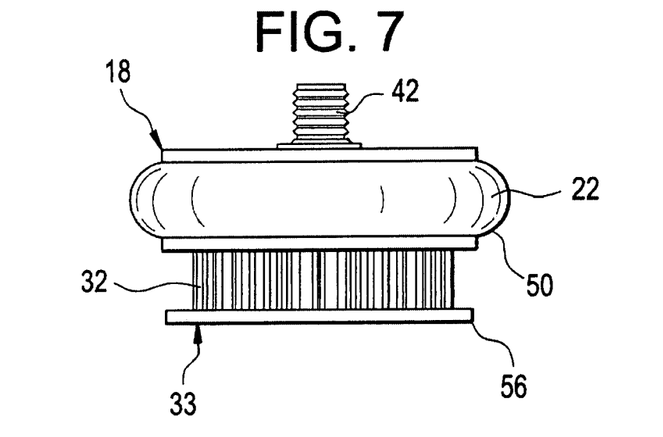
FIG. 7 is a top plan view of one of the wheels depicted in FIG. 2.
Figure 8:
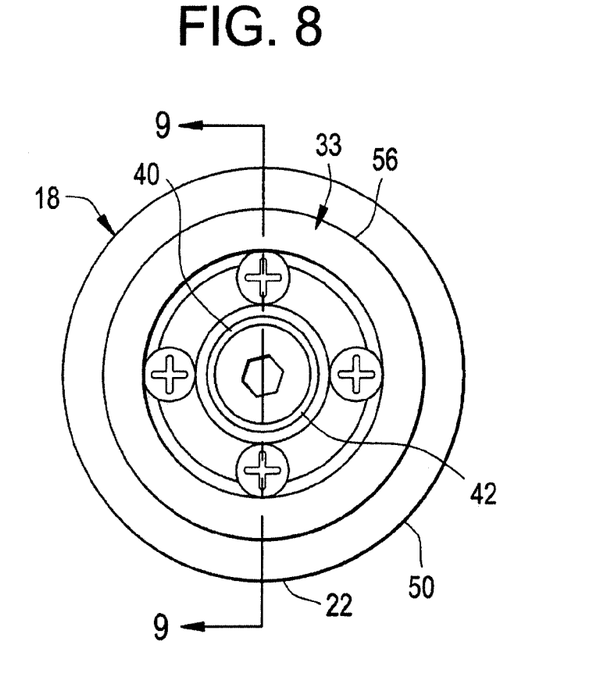
FIG. 8 is a front plan view of one of the wheels depicted in FIG. 2.
Figure 9:
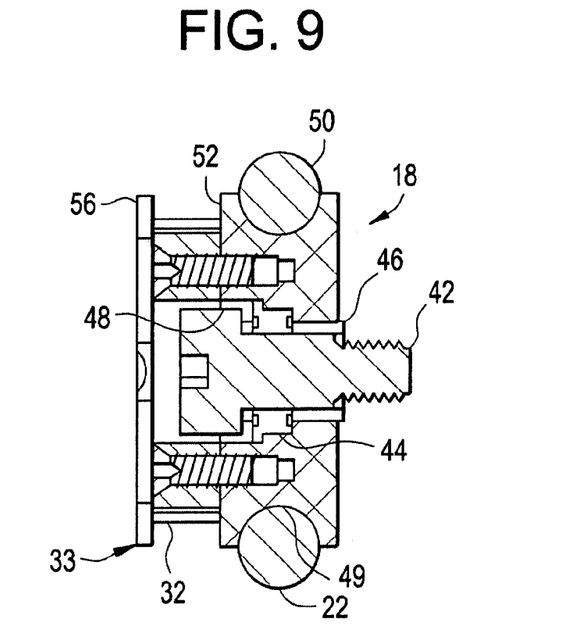
FIG. 9 is a cross-sectional view along lines 9-9 of FIG. 8.

Referring to FIGS. 1-18, a system 10 configured to inspect a stator core 12 of an electrical generator is provided. Referring to FIGS. 1, 2 and 6, the system 10 includes a sensing assembly 11, a controller 96 and a memory device 128. The sensing assembly 11 includes a trolley 100, a linear measurement device 14, and a pair of supplemental sensors 98.

Referring to FIGS. 1 and 2, the device 14 is mounted to trolley 100 and includes a set of wheels 18 longitudinally disposed along a longitudinal axis of the devices 14. The wheels 18 are rotatably attached to a frame 36 and are configured to roll across a surface 20 of the stator core 12. In particular, each wheel 18 has a contact surface 22 configured to roll on the surface 20 of the stator core 12. Thus, the wheels 18 of the device 14 contacts a significant amount of surface area of the stator core 12, as compared with a single encoder wheel rolling on the stator core 12. It should be noted that the system 10 can include more than one device 14 as desired.

Figure 3:
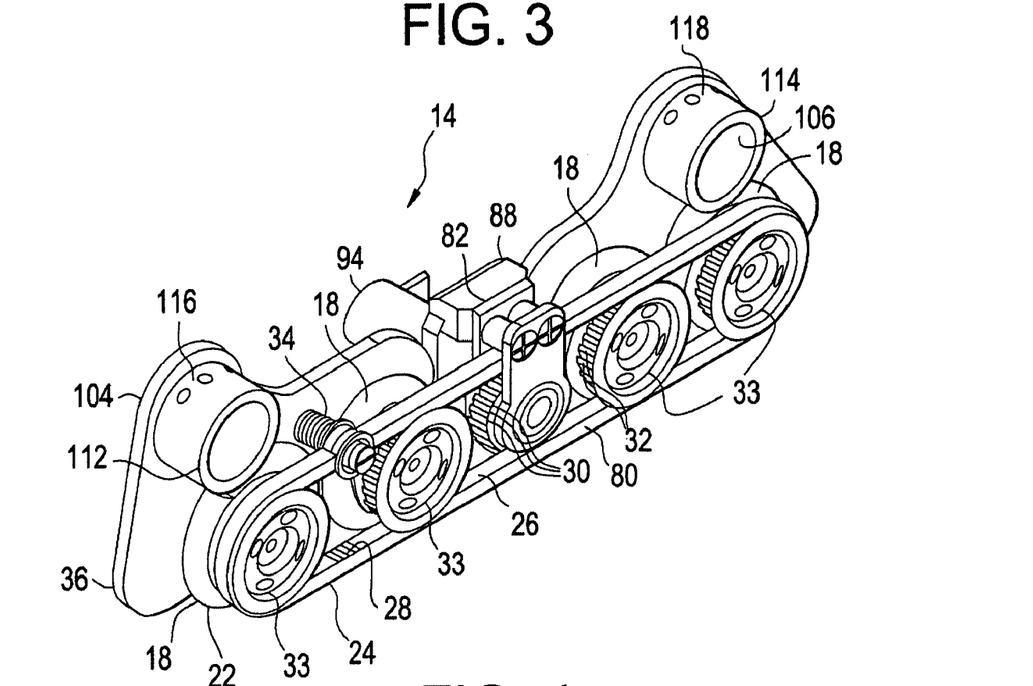
FIG. 3 is an enlarged front perspective view of the linear measurement device depicted in FIG. 2.
Figure 4:
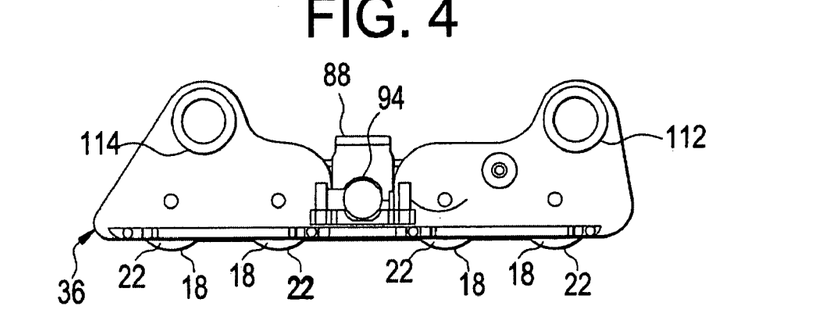
FIG. 4 is a rear plan view of a portion of the linear measurement device depicted in FIG. 2.
Figure 5:
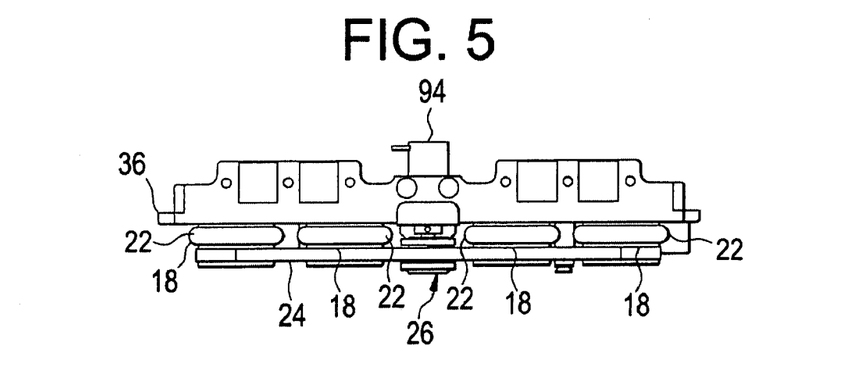
FIG. 5 is a top plan view of a portion of the linear measurement device depicted in FIG. 2.
Figure 10:
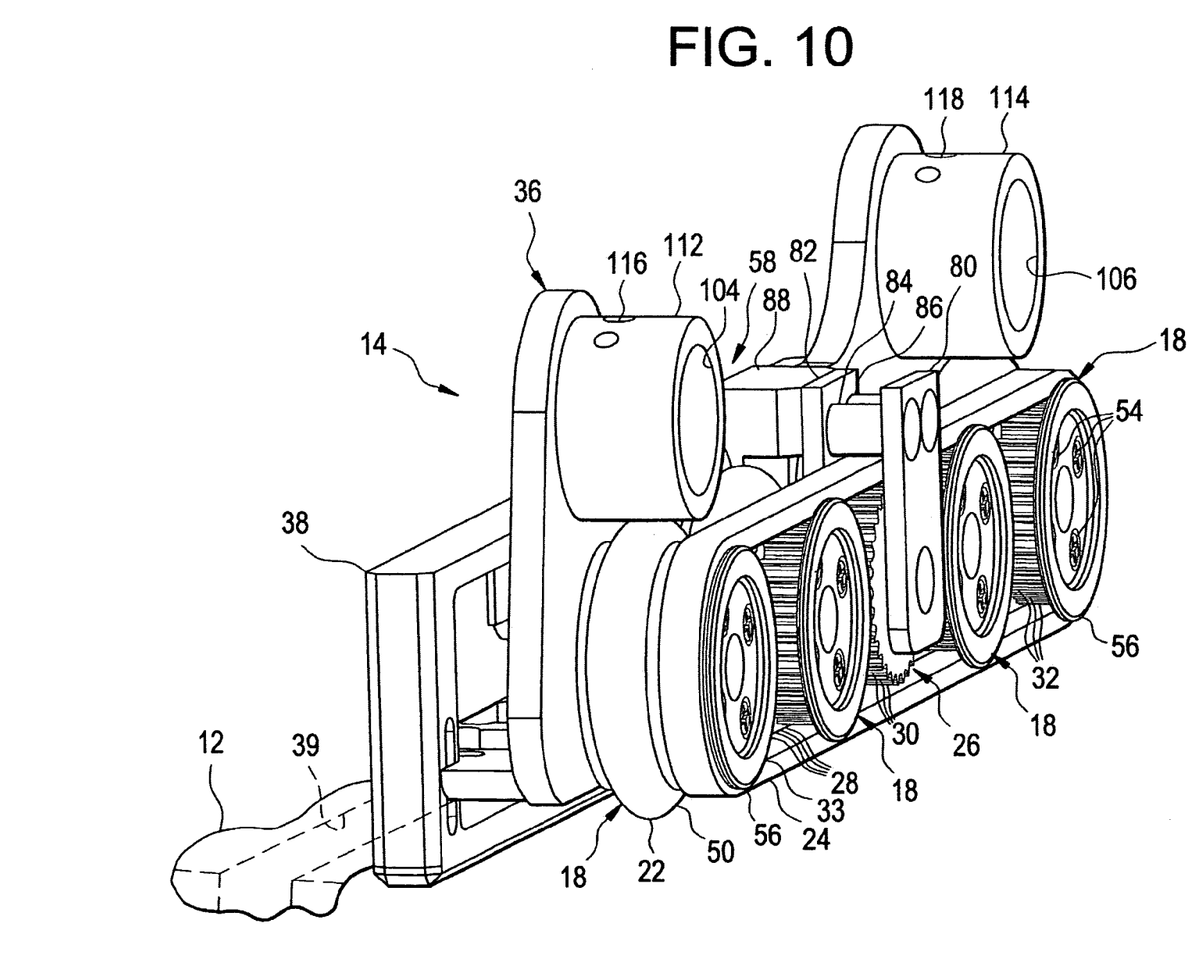
FIG. 10 is a perspective view of the device depicted in FIG. 2, in accordance with another exemplary embodiment.

Referring to FIGS. 3 and 10, the linear measurement device 14 further includes an encoder gear 26 and a belt 24 configured to engage the wheels 18 and the encoder gear 26, such that the rotation of one or more wheels 18 causes synchronous rotation of the encoder gear 26 and any remaining wheels 18. For instance, one rolling wheel 18 can be utilized to rotate the encoder gear 26, even though the remaining wheels 18 lack sufficient rolling friction to independently roll on the surface 20. Belt 24 has a plurality of teeth 28 that are configured to engage a plurality of teeth 30 of the encoder gear 26. Teeth 28 of belt 24 are further configured to engage a plurality of teeth 32 of a hub portion 33 of each wheel 18.

Referring to FIG. 3, the device 14 further includes a belt tensioner 34 configured to apply a tension force on the belt 24 so that the belt 24 engages the teeth of the hub portions 33 and the encoder gear 26 when one or more wheels 18 are rotated. In one exemplary embodiment, the belt tensioner 34 is a post with a roller configured to apply the tension force on the belt 24.

Referring to FIG. 10, the device 14 further includes a guiding bracket 38 configured to slide within a respective slot 39 of the stator core 12. Accordingly, as the device 14 travels along the surface 20 of the stator core 12, the guiding bracket 38 guides movement of the device 14 along the surface 20 of the stator core 12.

Referring to FIGS. 6-9, each wheel 18 of the device 14 has a center portion 52, hub portion 33, and an elastomeric ring 50. Hub portion 33 extends from the center portion 52 along a rotational axis of the wheel 18. Further, each hub portion 33 has an annular flange 56 configured to retain belt 24 on teeth 32 of the hub portion 33. It is contemplated that the hub portion 33 can be attached to the center portion 52 by a variety of suitable fasteners or otherwise be integral portions of the center portion 18.

The center portion 52 has a center hole 40 configured to receive a bearing 44, one or more spacers 46 and 48 a shoulder screw 42 fastened to the frame 36. The center portion 52 is formed from a magnet and is drawn to the stator core 12 for increasing the rolling friction of the wheel 18 and minimizing slip on the stator core 12. Further, the center portion 52 has a rim portion 49 configured to receive the elastomeric ring 50.

The elastomeric ring 50 has the contact surface 22 for contacting and rolling on the stator core 12. The elastomeric ring 50 is formed from a material having a substantially high coefficient of friction, e.g. $\mu$ (mu)=4.0, for preventing slippage of the wheels 18 on the surface 20 of the stator core 12. However, it is contemplated that the ring can be made of various suitable materials as desired.

Referring to FIGS. 11-14, the encoder gear 26 of linear measurement device 14 is rotatably mounted to a bracket assembly 58. In particular, a pair of shafts 60, 62 extends from opposing sides 68, 70 of the encoder gear 26. The shafts 60, 62 have journal sections 64, 66 configured to rotate within a pair of bearings 72, 74 mounted within respective openings 76, 78 of a pair of brackets 80, 82. A pair of spacers 84, 86 separates the brackets 80, 82 and defines a space for the encoder gear 26 to rotate between the brackets 80, 82. The brackets 80, 82 are secured to a base 88 by a pair of screw fasteners 90, 92 with the base 88 being attached to the frame 36. It is contemplated that the encoder gear 26 can be rotatably attached directly to the frame 36 by various suitable bracket assemblies.

Figure 11:
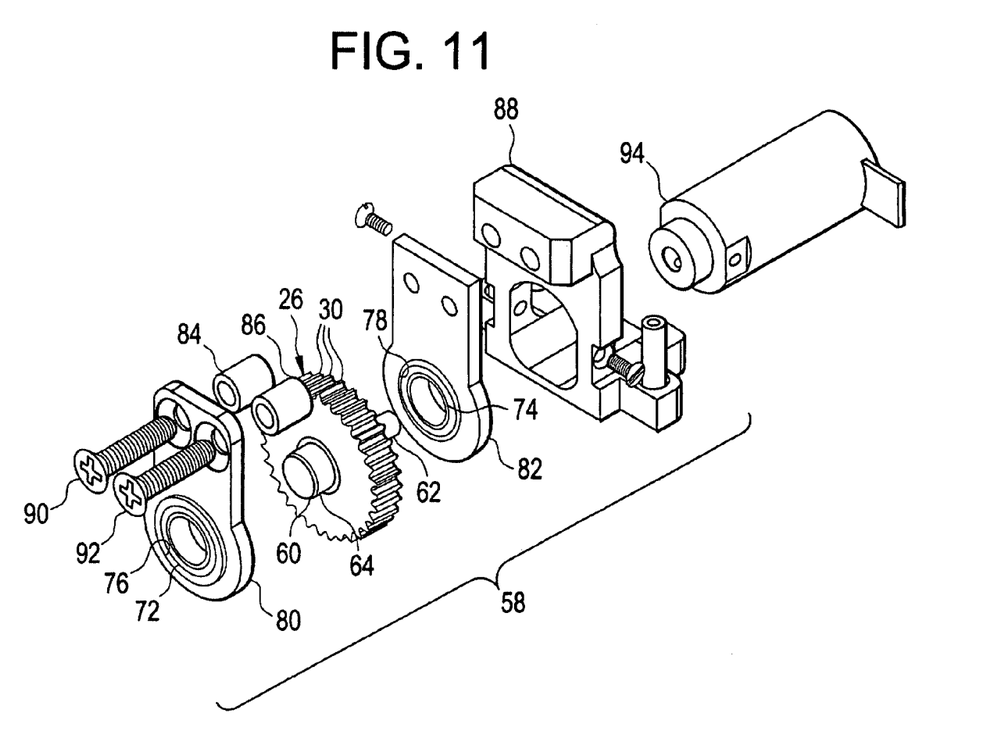
FIG. 11 is an exploded view of the encoder gear of FIG. 2.
Figure 12:
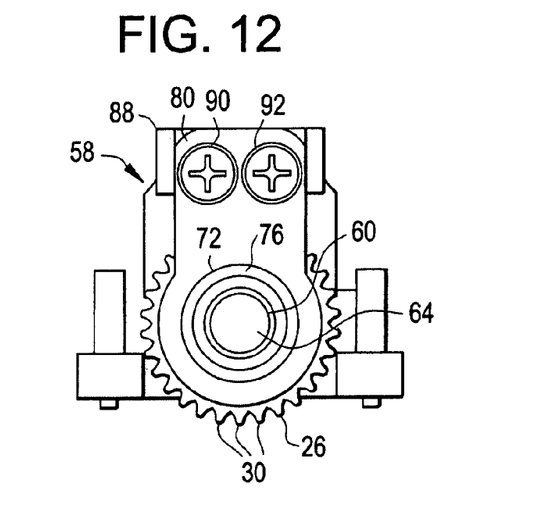
FIG. 12 is a front plan view of a portion of the linear measurement device depicted in FIG. 2.
Figure 13:
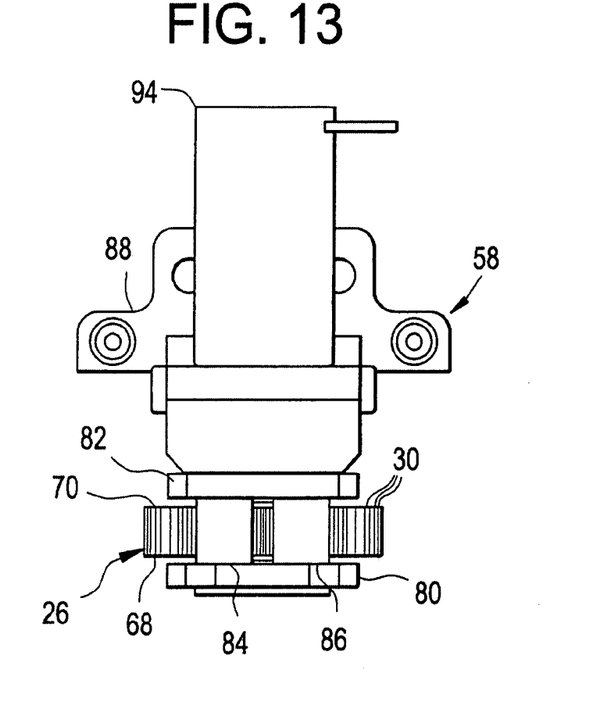
FIG. 13 is a top plan view of a portion of the linear measurement device of FIG. 2.
Figure 14:
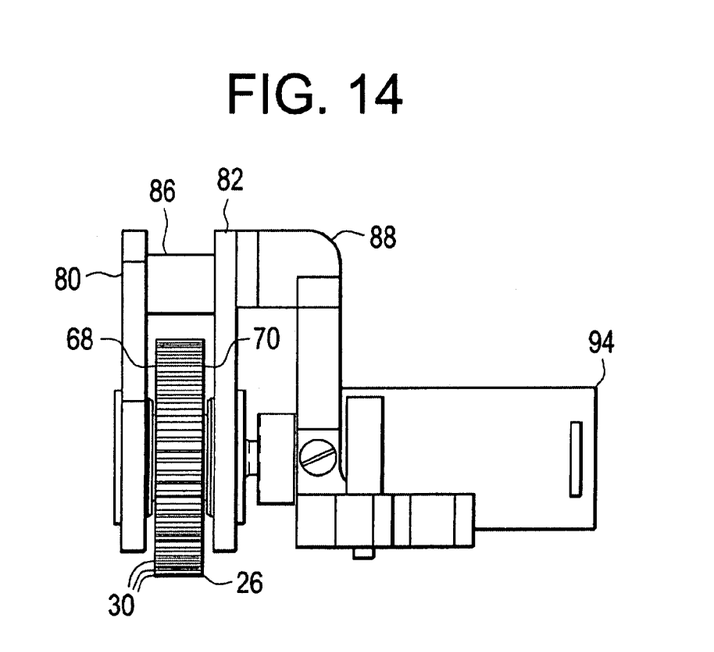
FIG. 14 is a side plan view of a portion of the linear measurement device depicted in FIG. 2.
Figure 15:
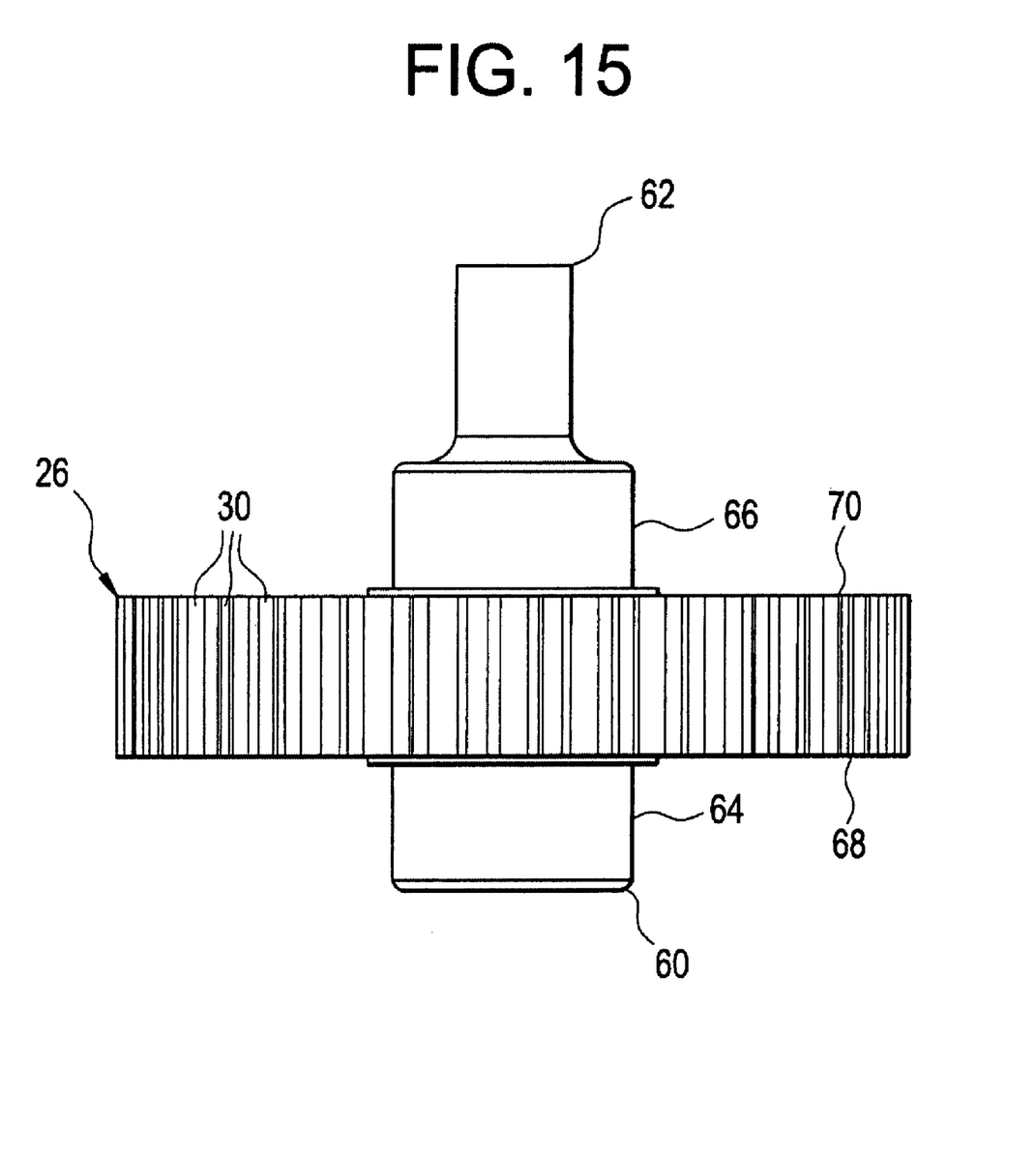
FIG. 15 is a top plan view of the encoder gear of FIG. 2.

Referring to FIGS. 1 and 11, the device 14 further includes a sensor 94 configured to generate a signal indicative of rotation of the encoder gear 26 and send the signal to the controller 96. The sensor 94 is an inductive sensor configured to receive shaft 62 of the encoder gear 26, wherein rotation of the shaft 62 induces the inductive sensor 94 to generate a signal indicative of a rotational position of the encoder gear 26 and further indicative of the linear position of the sensing assembly 11.

The controller 96 includes computer algorithms configured to determine a linear distance value based on the signal received from the position sensor 94 of the linear measurement device 14. The linear distance value is indicative of the linear distance that the device 14 traveled on the stator core 12. The controller 96 stores the linear distance value in a memory device 128 as detailed below.

In an alternative embodiment, the system 10 can include first and second linear measurement devices 14 with first and second position sensors 94, respectively. The first and second position sensors 94 can generate first and second signals indicative of a linear distance that the first and second linear measurement devices 14 traveled on the stator core 12. The controller 96 can determine an average linear distance value indicative of an average linear distance based on the first and second signals. Further, the controller can store the average linear distance value to the memory device 128.

Figures 16, 17:
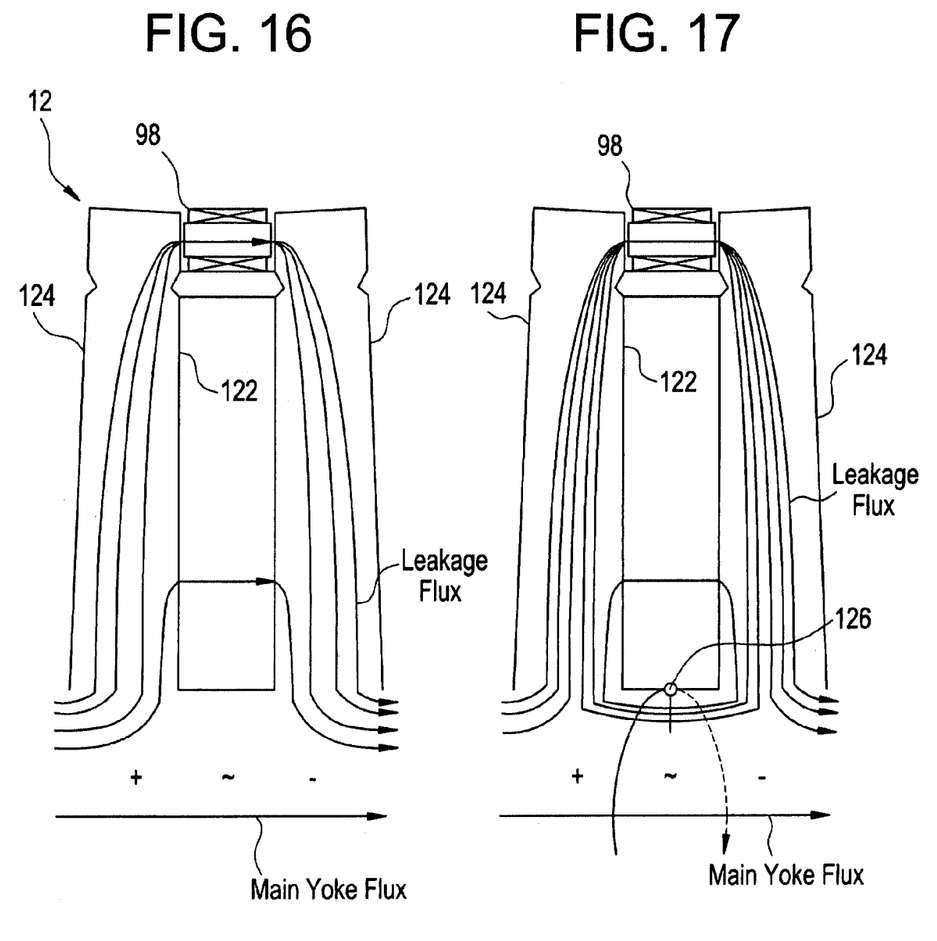
FIG. 16 is a cross-sectional view of the stator core of FIG. 1, illustrating a floating probe configured to detect a base flux pattern.
FIG. 17 is a cross-sectional view of the stator core of FIG. 1, illustrating a floating probe configured to detect a change in flux pattern for indicating a fault in the winding insulation.

Referring to FIGS. 2, 16 and 17, the sensing assembly 11 further includes a pair of supplemental sensors 98 or floating probes that are configured to detect one or more predetermined conditions, e.g. insulation breakdown, of the stator core 12. In particular, the floating probes 98 extend from a pair of opposing ends of a trolley 100 into a slot 122 defined by a pair of adjacent teeth 124 of the stator core 12. Probes 98 are in a spaced relationship between the opposing surfaces of the adjacent teeth 124. Guiding bracket 38 is configured to guide movement of the probes 98 along the stator core 12 with a substantially constant gap between the probes 98 and the teeth 124. Each probe 98 includes a sensing coil surrounding an iron core, with the coil sending a signal to the controller 96 indicative of a millivolt excitation through the iron core. More particularly, the coil is configured to generate a signal indicative of a change in flux pattern through the iron core. Based on the signal, the controller 96 determines that an abnormal flux pattern through the iron core is present, as compared to a base flux pattern. In that regard, the memory device 128 stores an abnormal flux value indicative of a fault 126 in winding insulation of a stator core 12. The controller 96 correlates the abnormal flux values to the linear distance values derived from rotational movement of the encoder gear 26 so that the locations of the faults are accurately identified and tracked.

Referring to FIG. 2, the device 14 mounted to the trolley 100, with the trolley 100 being configured to move along the surface 20 of the stator core 12. In particular, the frame 36 has a pair of collars 112, 114 with holes 104, 106 configured to receive arms 108, 110 extending from the trolley 100. Each collar 112, 114 has an aperture 116, 118 with a set screw 102 configured to engage a series of notches 120 formed in the arms 108, 110 and secure the device in a predetermined position on the arms 108, 110.

Figure 18:
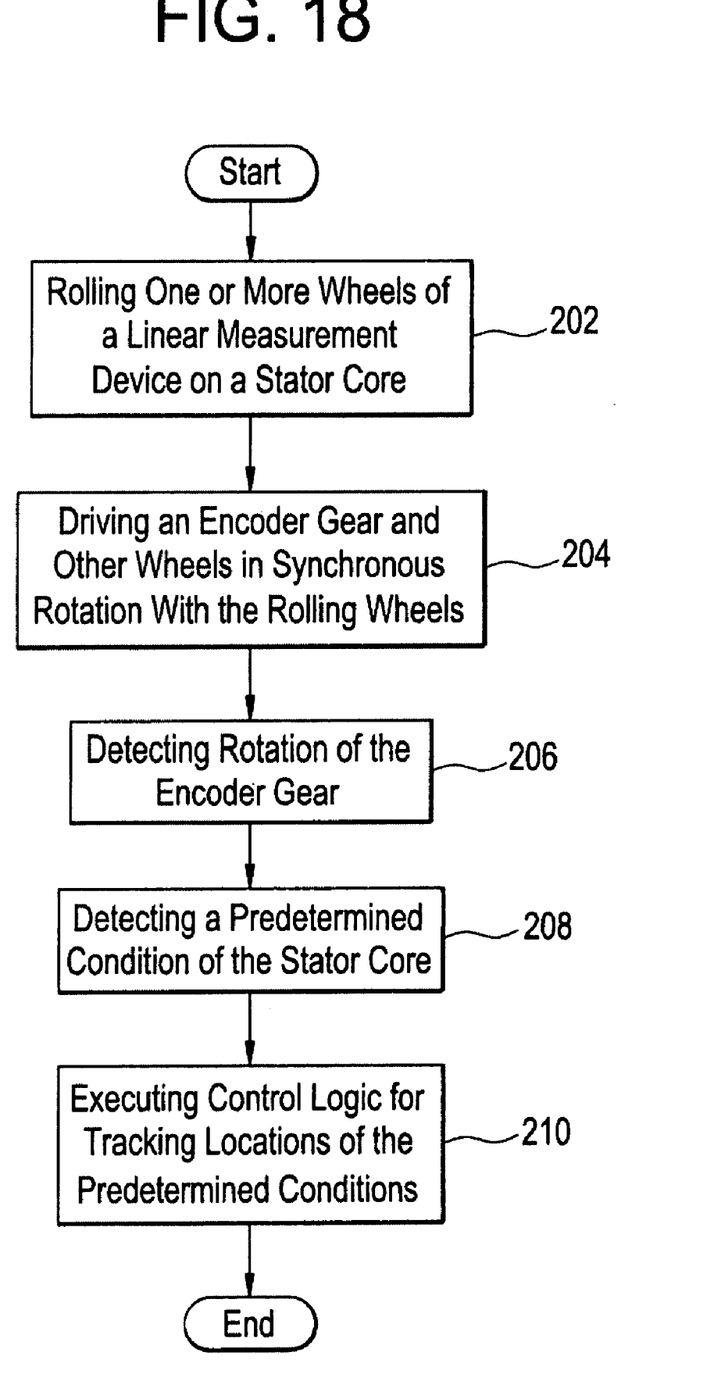
FIG. 18 is a logic flow diagram of a method of inspecting a stator core, in accordance with another exemplary embodiment.

Referring to FIG. 18, a logic flow diagram of a method of inspecting a stator core 12 will now be explained.

At step 202, the wheels 18 of device 14 are positioned on a surface 20 of the stator core 12. More particularly, the wheels 18 of device 14 contact the surface 20 of the stator core 12, with one or more wheels 18 rolling along the same.

Next at step 204, the wheels 18 of device 14 are engaged to an encoder gear 26 by a belt 24. In this respect, the wheels 18 are in a fixed rotational relationship with the encoder gear 26. It is understood that the device 14 can have a variety of suitable drive mechanisms to engage the wheels 18 and the encoder gear 26. Moreover, as detailed above, device 14 has a belt tensioner 34 configured to apply a tension force on the belt 24, such that the belt 24 engages the wheels 18 and the encoder gear 26.

Next at step 206, a sensor 94 of device 14 generates a signal indicative of rotation of the encoder gear 26 and transmits the signal to a controller 96. In the exemplary embodiment, the sensor 94 is an inductive sensor that receives shaft 62 of the encoder gear 26, with the shaft 62 being configured to trigger the inductive sensor for generating the signal indicative of rotation of the encoder gear 26.

Next at step 208, the sensing assembly 11 has a pair of supplemental sensors 98 configured to generate a pair of supplemental signals indicative of a predetermined condition, e.g. insulation breakdown. Supplemental sensors 98 transmit the supplemental signals to the controller 96. It is contemplated that other suitable sensors can be used to track a variety of conditions in the stator core 12.

Next at step 210, the controller 96 determines a linear distance value indicative of a linear distance that the linear measurement device 14 traveled on the stator core 12, based on the signal from the position sensor 94. In addition, the controller 96 determines an abnormal flux value indicating a fault 126 in the stator core 12 based on the supplemental signals from supplemental sensors 98. The controller 96 tracks the faults in the stator core 12, by correlating the linear measurement values to the abnormal flux values. It is contemplated that the supplemental sensor can be utilized for detecting a variety of conditions of the stator core 12.

The linear measurement device and methods described herein provide a substantial advantage over other devices and methods. In particular, the linear measurement device provides a technical effect of accurately determining a linear distance that the linear measurement device has traveled utilizing an encoder gear coupled to multiple wheels, via a belt.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A linear measurement device, comprising:
a plurality of wheels rotatably mounted to a frame, each of the plurality of wheels having a contact surface and a hub portion;
an encoder gear rotatably mounted to the frame;
a sensor configured to detect rotation of the encoder gear; and
a belt configured to engage the hub portion of each of the plurality of wheels and the encoder gear, and rotation of one of the plurality of wheels causes synchronous rotation of the encoder gear and other wheels of the plurality of wheels.

2. The linear measurement device of claim 1 wherein the sensor generates a signal indicative of rotation of the encoder gear, and the linear measurement device further comprises a controller configured to receive the signal and determine a linear distance value indicating a linear distance that the linear measurement device has traveled based on the signal, the controller further configured to store the linear distance value in a memory device.

3. The linear measurement device of claim 1 wherein the encoder gear has a plurality of teeth engaged to a plurality of teeth of the belt.

4. The linear measurement device of claim 1 wherein the hub portion of each of the plurality of wheels has a plurality of teeth engaged to a plurality of teeth of the belt.

5. The linear measurement device of claim 1 wherein the hub portion of each of the plurality of wheels has an annular flange configured to retain the belt on the hub portion between the annular flange and a center portion of the wheel.

6. The linear measurement device of claim 1 wherein each of the plurality of wheels has a rim portion coupled to the hub portion, the contact portion comprises an elastomeric ring configured to engage the rim portion.

7. The linear measurement device of claim 1 further comprising a belt tensioner configured to apply a tension force on the belt.

8. The linear measurement device of claim 1 further comprising a pair of brackets wherein the encoder gear is rotatably mounted to the pair of brackets.

9. The linear measurement device of claim 8 further comprising a base wherein the pair of brackets is attached to the base.

10. The linear measurement device of claim 1 further comprising a guiding bracket configured to be inserted within a slot of a stator core, the guiding bracket guiding movement of the linear measurement device along the stator core.

11. A system for inspecting a stator core, comprising:
a trolley configured to move along the stator core;
a linear measurement device mounted to the trolley, the linear measurement device having a plurality of wheels rotatably mounted to a frame, each of the plurality of wheels having a contact surface and a hub portion, an encoder gear rotatably mounted to the frame, a sensor configured to generate a signal indicative of rotation of the encoder gear, and a belt configured to engage the hub portion of each of the plurality of wheels and the encoder gear, and rotation of one of the plurality of wheels causes synchronous rotation of the encoder gear and other wheels of the plurality of wheels; and
a controller configured to receive the signal and to determine a linear distance value indicating a linear distance that the linear measurement device has traveled on the stator core.

12. The system of claim 11 wherein the linear measurement device has pair of collars defining a pair of holes, the pair of holes being configured to receive a pair of arms extending from the trolley for mounting the linear measurement device to the trolley.

13. The system of claim 11 wherein the linear measurement device further has a pair of set screws that are attached to the pair of collars, the pair of set screws being configured to engage a plurality of notches in the pair of arms to secure the linear measurement device in a predetermined position on the pair of arms.

14. The system of claim 11 wherein the linear measurement device is mounted to one side of the trolley and another linear measurement device is mounted to another side of the trolley.

15. The system of claim 11 wherein each of the plurality of wheels are formed from a magnet configured to be drawn towards the stator core for increasing rolling friction on the stator core.

16. The system of claim 11 further comprising a guiding bracket configured to be inserted within a slot of the stator core, the guiding-bracket guiding movement of the linear measurement device along the surface of the stator core.

17. A method of detecting a linear distance of a linear measurement device on a stator core, comprising:

rolling at least one of a plurality of wheels of the linear measurement device along a surface of the stator core;

synchronously rotating an encoder gear of the linear measurement device with at least one of the plurality of wheels, the plurality of wheels and the encoder gear being rotatably coupled to each other by a belt, the belt being configured to engage the encoder gear and a hub portion of each of the plurality of wheels;

generating a signal from a sensor operably coupled to the encoder gear, the signal indicative of a position of the encoder gear; and determining a linear distance value indicating the linear distance that the linear measurement device has traveled on the stator core based on the signal, utilizing a controller.

18. The method of claim 17 further comprising storing the linear distance value on a memory device, utilizing the controller.

19. The method of claim 17 further comprising generating a supplemental signal from a supplemental sensor coupled to the controller, the supplemental signal indicative of a predetermined condition of the stator core.

* * * * *